United States Patent [19]
Wirth et al.

[11] 4,088,014
[45] May 9, 1978

[54] MASS AND FORCE METER

[75] Inventors: Armin Wirth; Johannes Wirth; Mario Gallo, all of Zurich, Switzerland

[73] Assignee: Wirth, Gallo & Co., Switzerland

[21] Appl. No.: 648,366

[22] Filed: Jan. 12, 1976

[30] Foreign Application Priority Data

Apr. 1, 1975 Switzerland .................. 00413/75

[51] Int. Cl.² .................................................. G01L 1/10
[52] U.S. Cl. .............................. 73/141 R; 73/DIG. 1; 177/210 FP
[58] Field of Search .......... 73/141 R, 141 A, DIG. 1; 177/210 R, 210 FP

[56] References Cited

U.S. PATENT DOCUMENTS

| 3,423,999 | 1/1969 | Wirth et al. | 73/141 |
| 3,692,128 | 9/1972 | Gallo | 73/141 |
| 3,805,605 | 4/1974 | Saner | 177/210 |

Primary Examiner—Herbert Goldstein
Attorney, Agent, or Firm—Stevens, Davis, Miller & Mosher

[57] ABSTRACT

A mass and force meter comprising a frame, a load support, a digital evaluation and display device and two electrically-excited, transversely-vibrating, pre-tensioned strings each having one end fixed to the frame. The other ends of the strings are connected to a force distributor, and first and second transmission elements are provided for transmitting to the force distributor a pre-tensioning force and a force which depends on the load to be measured. One end of each of the transmission elements is fixed to the force distributor and the other ends are connected to the respective pre-tensioning and load forces. A guide member having one end connected to the frame and the other end connected to the force distributor acts together with the strings to guide the force distributor in a statically defined manner relative to the frame with respect to the pre-tensioning force and the force established by the load to be measured. Means are further provided for applying to the evaluation display device the resultant frequency variations caused by application of load to the strings thereby permitting measurement and display of the magnitude of the measured load.

7 Claims, 9 Drawing Figures

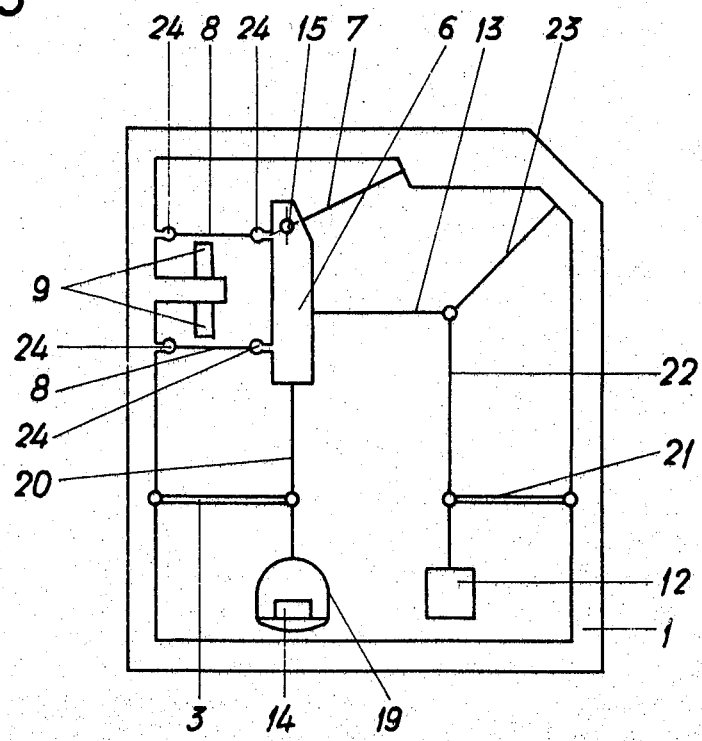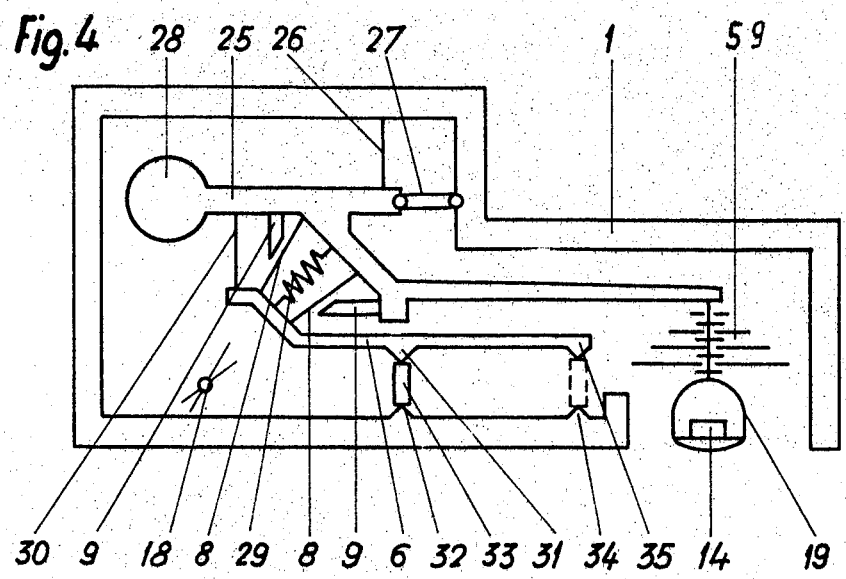

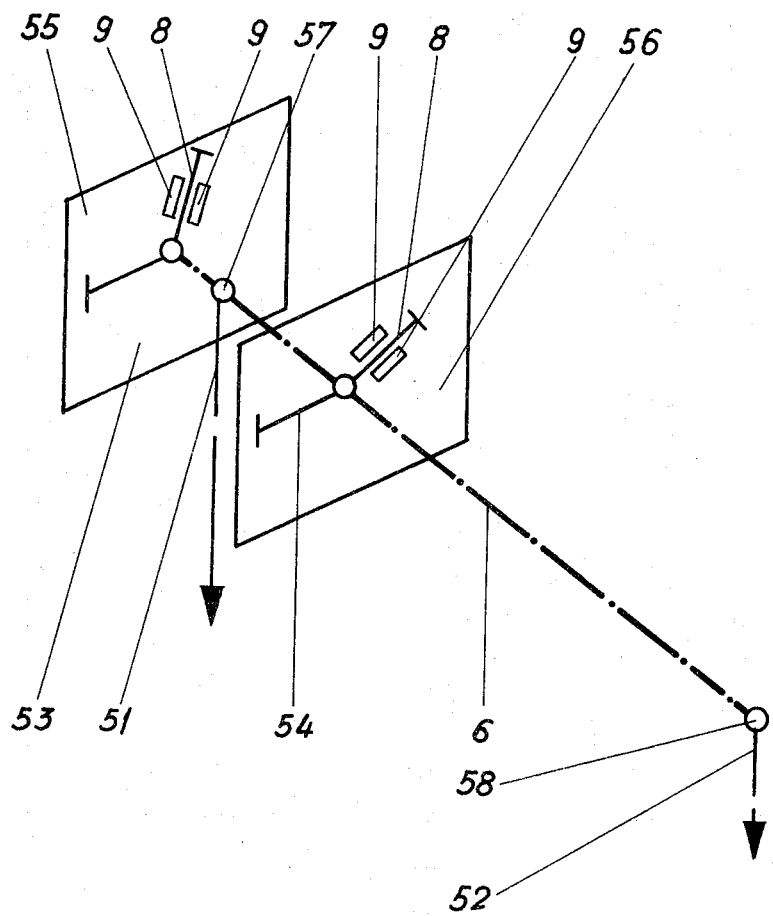

MASS AND FORCE METER

The present invention relates to a mass and force meter with a frame, a load-support and a measuring system, wherein the mass or force to be measured acts indirectly on the tension of two transversally vibrating, pre-loaded strings excited by electronic means, so that the resultant frequency changes serve for calculating the magnitude of said mass or force in a computing device. Both strings, a first transmission element for the transmission of a pre-loading force and a second transmission element for the transmission of a force depending on the load to be measured are fixed to a force distributor.

Such meters are well known. Swiss Pat. No. 469 973 describes such a device used as a scale, wherein two parallel, vertically mounted strings are pre-loaded by the weight of a pre-loading mass. A first vertical transmission element connects the mass to a lever acting as a force distributor. These strings are additionally loaded by a force depending on the load to be measured which is transmitted to the force distributor by a second vertical transmission element. U.S. Pat. No. 3 423 999 describes a mass and force meter of the same type, wherein both strings and both transmission elements radiate from a central point, so that the distribution of the mentioned forces between both strings is determined by the direction of these two forces relative to that of the two strings. The central body to which two strings and the two transmission elements are fixed has only a fastening function; it is not a force distributor.

In these meters the transmission ratio of the two forces on the two strings can be adjusted. In the first meter mentioned this adjustment is made by varying the distances of the four elements parallel to each other, i.e. the two strings and the two transmission elements. That means that the adjustment is made by variation of the ratios of the lever arms. To obtain an accurate adjustment, these lever arms must be long enough, i.e. they must have a certain mass. The meter as a whole becomes then sensible to shocks, if the four degrees of freedom not involved in the measuring process are not excluded by guides and if the moment of inertia of the lever in the plane of the string is not compensated by a second lever.

The second meter offers a solution to overcome this disadvantage. The adjustment is carried out by varying the directions of the two forces relatively to the two non-parallel strings. An accurate adjustment of the angles can only be obtained if the two strings and the two force transmission elements are long enough, which entails technical problems eventually limiting the efficiency of the meter. Also a geometrical imperfection of the parts can have a negative influence on the characteristic curve of the meter. In particular, an eccentric fastening of the transmission elements to the central body can cause a load-depending rotation of this body.

This rotation does not cause an error only if it is compensated by an adjustment of the angles which increases the adjusting range. Substituting the massive force distributor with wire-shaped transmission elements has the advantage of making the meter comparatively insensible to shocks. The mass of the central body forming the fastening head is considerably smaller than the mass of the force distributor of the first mentioned meter. This property of the force distributor is useless for the scale, when the weight of the pre-loading mass or the force depending on the load to be measured are transmitted to the two strings by a transmission chain, i.e. by a number of consecutive massive transmission elements.

It is an object of the present invention to create means permitting a more accurate adjustment than that of known meters and for meters with a transmission chain, permitting to simplification of the entire construction and obtaining high insensibility to shocks.

Another object of the invention is to guide the force distributor in a statically determined way relative to the frame by means of the two strings and of at least one guide with respect to the preloading force and to the force depending on the load to be measured.

A further object of the invention is to provide a mass and force meter comprising a frame, a load support, digital evaluation and display means mounted on said frame, two electrically excited, transversely vibrating, pre-tensioned strings, each having one end fixed to said frame, a force distributor, the other ends of said strings being connected to said force distributor, first and second transmission elements for transmitting to said force distributor a pretensioning force and a force depending on the load to be measured respectively, on one end of each of said transmission elements being fixed to said force distributor, their other ends being operatively connected to receive their respective forces, means for applying to the evaluation and display means resultant frequency variations caused by the application of said loads to said strings for computation and display of the magnitude of the measured load, a guide having one end connected to said frame and its other end connected to said force distributor, said guide and said strings guiding said force distributor in a statically defined way relative to said frame with respect to said pre-tensioning force and said force depending on the load to be measured.

In the accompanying drawing some embodiments of the object of the invention are schematically represented.

FIG. 1–5 each show an embodiment of the invention,

FIG. 6–7 each show a variant of the embodiment of FIG. 5,

FIG. 9 shows a schematic representation of a force distributor with its guiding elements.

Figure 1:
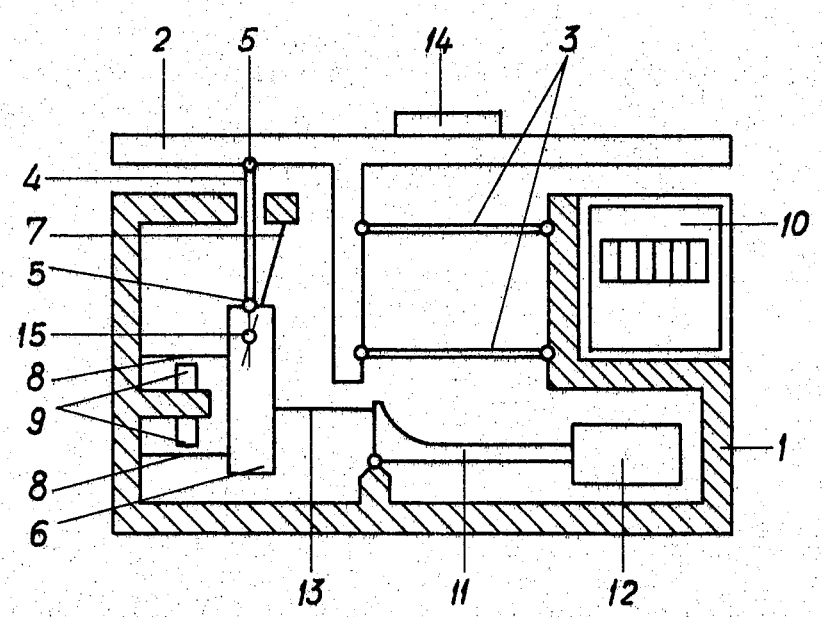

FIG. 1 shows a first embodiment. It represents a table balance. All of the components are located substantially in the plane of the drawing. This balance has a frame 1, to which a load support 2 is fixed by means of guides 3. A rigid rod 4 with two hinges 5 is fixed to load support 2. The lower end of this rod 4 is connected to a force distributor 6 which is suspended to a guide 7 fixed to frame 1. This guide 7 consists preferably of a wire. It is mounted obliquely so as to form an angle of 50° to 85° with a horizontal plane. Two identical, horizontal strings 8 are fixed to frame 1, their other ends being connected to force distributor 6. Exciting and sensing heads 9 are mounted between strings 8 and connected to a digital evaluation and display device 10. A two-arm lever 11 is rotatably mounted on frame 1. A pre-loading mass 12 is fixed to its substantially horizontal arm. Its substantially vertical arm is connected to force distributor 6 by means of a wire 13. The weight of the pre-loading mass 12 creates the pre-loading force acting on force distributor 6. Wire 13 being located in the horizontal symmetry plane between the two strings 8, and pre-loading force acting through wire 13 is evenly distributed between the two strings 8. Due to the pre-loading force, these strings 8 remain always under tension. Guide 7 is obviously not loaded by this pre-loading force. A mass 14 whose magnitude is to be determined, is put on load support 2. Its weight is transmitted to force distributor 6 by rod 4. The force acting on force distributor 6 is proportional to the weight to be measured. It is called the measuring force. This measuring force is compensated by guide 7 and by the two strings 8 in such a way that guide 7 is under traction, while the two strings 8 are under the action of a horizontal force, whose line of action passes through the intersection point 15 of the axes of rod 4 and guide 7. The vertical component of the force of traction in guide 7 is equal and opposite to the measuring force transmitted by rod 4, and the horizontal components of this force of traction in guide 7 is equal to the horizontal force acting on strings 8. This horizontal force is not evenly distributed between the two strings 8. It is divided into two unequal components in proportion to the height of the intersection point 15 above the horizontal planes through each of the two strings 8. In the embodiment represented the upper string 8 is loaded additionally to the pre-load and the lower one is, to a lower extent, relieved. In the whole measuring range this relief remains always smaller than the pre-loading force, so that the lower string 8 remains under traction. Thus the three guiding elements of force distributor 6, i.e. guide 7 and both strings 8, are under traction in the whole measuring range. The force distributor 6 is guided by guide 7 and by strings 8 in a statically determined way relative to frame 1, with regard to the pre-loading force and to the measuring force.

Because of the described disposition of guide 7 (a large angle with the horizontal plane) the measuring force transmitted by rod 4 to force distributor 6 is reduced when distributed between strings 8.

Figure 2:
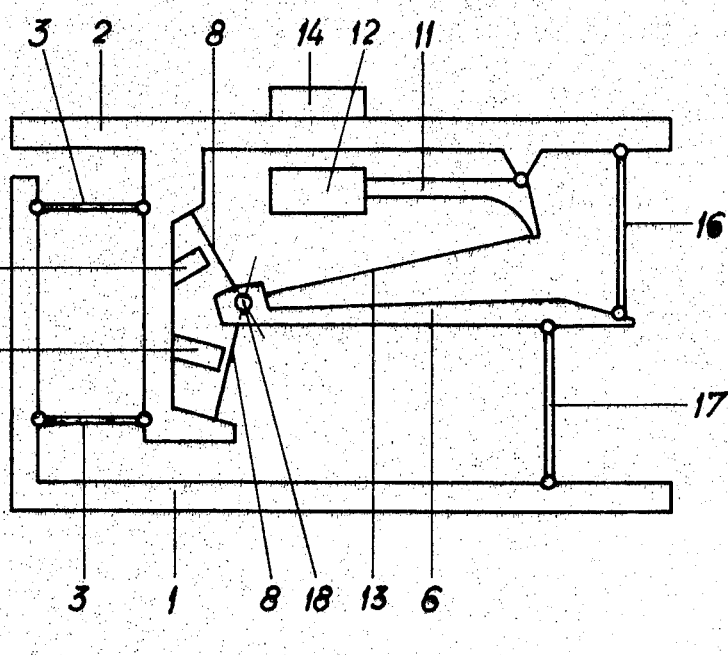

In the embodiment according to FIG. 2 another table balance is represented, wherein strings 8, exciting and sensing heads 9, and lever 11 with the pre-loading mass 12 are not fixed to frame 1, but to load support 2. In this embodiment force distributor 6 is elongated and mounted substantially horizontal. It is connected to load support 2 by means of a guide 16 consisting of a rod with two hinges. This guide 16 allows for a statically determined guidance of force distributor 6 relatively to the load support 2. Another guide 17, also consisting of a rod with two hinges, connects force distributor 6 to frame 1. This guide 17 allows, together with both guides 3, for a statically determined guidance of load support 2 relative to frame 1. It also transmits the measuring force to force distributor 6.

Apart from the inverted arrangement of the main elements of the balance, this embodiment differs from that of FIG. 1 by the geometrical arrangement of various elements. Strings 8 form an obtuse angle. Wire 13 passes through the intersection point 18 of the axes of the two strings 8 along the bisector of their angle, and transmits the pre-loading force evenly, but multiplied, to both strings 8. The weight of mass 14 to be determined loads force distributor 6 through vertical guide 17. This load, i.e. the measuring force, is compensated by guide 16 and by strings 8. Guide 16 being vertical too, the vectorial sum of the two forces acting on strings 8, and generated by the measuring force, is a vertical force with its line of action passing through intersection point 18. The magnitude of this force depends on the horizontal position of this intersection point 18 relative to guides 16 and 17.

With the length and angle proportions chosen in this embodiment, the measuring force is reduced when transmitted to strings 8. The lower string 8 is loaded additionally to the pre-loading force, the upper one is, to a lower extent, relieved. By varying the relative position of these elements, different distributions of the measuring force can be obtained. As in the first embodiment, here too force distributor 6 is guided in a statically determined way, with regard to the pre-loadng force and the measuring force, relatively to the frame 1, by strings 8 and guides 16,17.

Guide 17 could present a certain axial elasticity, and could be replaced by a stiff spring. Thereby the pre-loading mass 12 would be connected to load support 2 stiffer than load support 2 is connected to frame 1. This brings known advantages in the case of shocks and vibrations.

In FIG. 3 a third embodiment of a table balance is represented. Load support 19 is suspended from a vertical wire 20 fixed to force distributor 6. A guide 3 is fixed at the end of wire 20 to guide load support 19 with respect to frame 1. Also pre-loading mass 12 is guided by a single guide 21 with respect to frame 1. It is suspended to a wire system 22,23 to which horizontal wire 13 is fixed. By varying the inclination of part 23 of the wire system 22,23, the transmission ratio of the weight of pre-loading mass 12 to force distributor 6 can be adjusted. The resultant pre-loading force acting on force distributor 6 is evenly distributed between the two horizontally mounted strings 8. Guide 7 is so mounted that its angle with the horizontal plane is smaller than 45°. The ratio with which the measuring force — i.e. of the force acting in wire 20 — is transmitted to the two strings 8 is thus correspondingly increased. Frame 1 and force distributor 6 are provided with fastening heads 24 for the ends of strings 8 which are acting as low-pass filters, in order to avoid disturbing vibration couplings in the range of the frequencies of the strings. Force distributor 6 is guided in a statically determined way by the two strings 8 and by guide 7 with respect to frame 1.

In the embodiment according to FIG. 4, a two-step analytical scale is represented. A main lever 25 is connected to frame 1 by means of a wire serving as a vertical guide 26 and of a rod serving as horizontal guide 27. Load support 19 is suspended at one of its ends, at its other end it has a counter-weight 28. The two strings 8 and the exciting and sensing heads 9 are fixed to lever 25. The other ends of the strings 8, forming an acute angle, are fixed to a part of force distributor 6. Between lever 25 and force distributor 6 a pre-loaded pressure spring 29 is mounted. Its line of action corresponds to the bisector of the angle formed by strings 8 and passes through intersection point 18. Thus this spring 29 generates a pre-loading force evenly distributed between strings 8. As the pre-loading force is produced by a spring, the device represented can be considered as a force meter used as a scale.

Furthermore, force distributor 6 is connected to lever 25 by means of a wire-shaped guide 30. Force distributor 6 together with lever 25 with its counter-weight 28 and load support 19 rests on frame 1 by means of knife edges 31,32 and a support 33. Lever 25 and force distributor 6 are thus guided in a statically determined way relatively to frame 1. Force distributor 6 is loaded by the measuring force through support 33. Knife edges 31,32 are disposed one upon the other, forming a vertical guide with support 33. A second position of support 33 is represented with dotted lines, in which it is mounted between two further knife edges 34,35. This corresponds to a change of the transmission ratio of the load on the strings 8, i.e. of the ratio between the weight of mass 14 and of part of the weights set 59 and the measuring force acting on force distributor 6, as well as of the ratio of this measuring force and the actual additional load of strings 8. With a suitable well known automatic device, the above described meter can be used as two-step analytical scale.

If main lever 25 and force distributor 6 are considered as a unit, this unit is guided by vertical guide 26, horizontal guide 27 and vertical support 33. The measuring force loading force distributor 6 through support 33 is generated by the total load. The arm length with which this load acts on guide 26 is much longer than that of the counter-force through support 33 relative to the same guide 26. Therefore support 33 is loaded by a vertical force, the measuring force, which is, in the same ratio as that of said arm lengths, larger than the load itself. Horizontal guide 27 remains thereby unloaded. Considering now main lever 25 as being fixed to frame 1, it is loaded by the vertical measuring force through support 33, but not guided. Guide 30 being vertical, the vertical force through support 33 generates two forces acting upon strings 8, whose vectorial sum is a vertical force with its line of action passing through intersection point 18. The horizontal distance from the axis of guide 30 to intersection point 18 being considerably smaller than the distance from this axis to support 33, the vectorial sum of the forces acting on strings 8, i.e. the vertical force through intersection point 18, is much bigger than the vertical measuring force. Because of the acute angle formed by strings 8 this force through intersection point 18 is highly multiplied when transmitted to string 8. With the disposition chosen the left string 8 is additionally loaded and the right string 8 is, to a lower extent, relieved.

Figure 5:
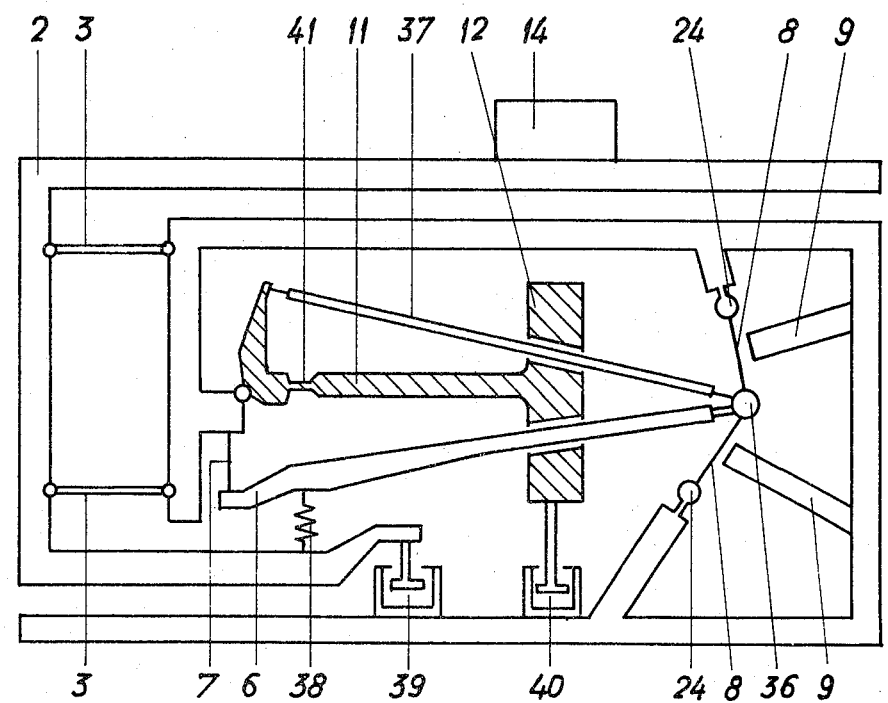

In FIG. 5 a fifth embodiment is represented, it is a table balance. The disposition of the main elements corresponds to that of FIG. 1. Frame 1 and force distributor 6 are provided with fastening heads 24 and 36 for strings 8. The weight of the pre-loading mass 12 fixed to the two-arm, rotatably mounted lever 11 is transmitted to head 36 of force distributor 6 by means of a rod 37 serving as a transmission element. Load support 2 is connected to force distributor 6 by means of a spring 38 serving as a force transmission element, so that the weight of mass 14 acts on force distributor 6 through this spring 38. Between load support 2 and frame 1 a viscosity absorber 39 is provided. Another viscosity absorber 40 is provided between pre-loading mass 12 and frame 1. Lever 11 presents a reduced section 41 acting like a leaf spring, so that the statically determined guidance of the pre-loading mass 12 relative to frame 1 is resilient. Spring 38 and absorbers 39,40 serve for eliminating the high frequency parts of the forces acting on strings 8. Force distributor 6 is guided in a statically determined way relatively to frame 1 by guide 7 and by both strings 8 with regard to the pre-loading force in rod 37, and to the measuring force through spring 38.

Figure 6:
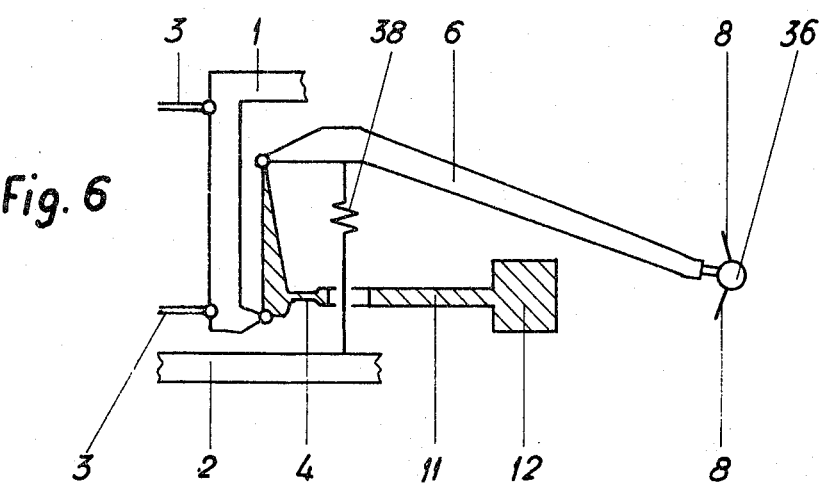

FIG. 6 shows a variant of the embodiment according to FIG. 5, wherein instead of wire-shaped guide 7 the vertical arm of lever 11 serves as a guide between force distributor 6 and frame 1. Force distributor 6 is then guided by this arm and by both strings 8.

Figure 7:
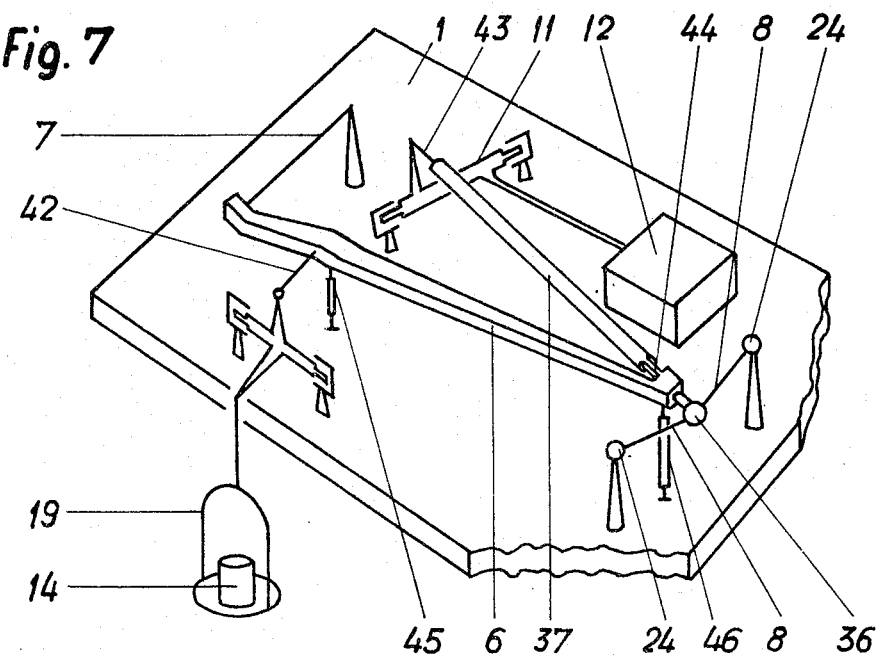

FIG. 7 shows, in a perspective view, a variant of the embodiment according to FIG. 5. Force distributor 6, guide 7, both strings 8 and rod 37 are mounted horizontally. The weight of mass 14 is transmitted to force distributor 6 by means of a wire-shaped guide 42. Rod 37 presents at one end a pin 43 serving as a joint, and at its other end a leaf-spring 44 laying in a vertical plane, also serving as a joint. Furthermore, two vertical guides 45,46 are provided, which determine statically, together with rod 37, the height of force distributor 6. Force distributor 6 is guided in a statically determined way, relatively to frame 1, by guide 7 and both strings 8 with regard to the pre-loading force in rod 37 and to the measuring force in guide 42.

Figure 8:
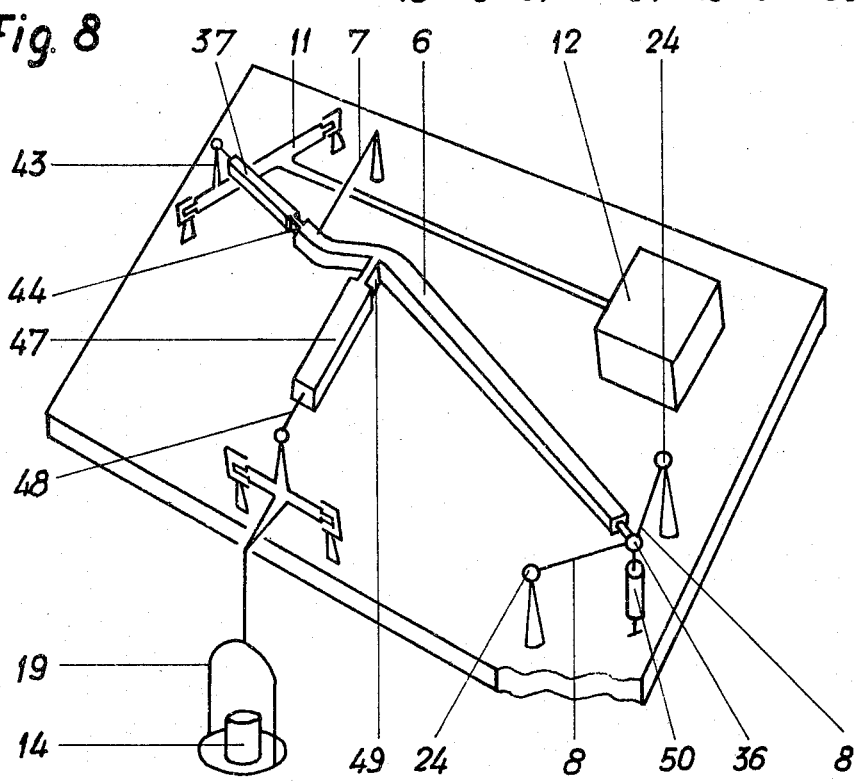
FIG. 8 shows a variant of the embodiment of FIG. 7.

FIG. 8 shows a further variant to FIG. 5 and FIG. 7. The wire-shaped guide 42 of FIG. 7 is replaced by a traction rod 47, which has as terminal joints at one end a pin 48 and at the other end a leaf-spring 49 laying in a vertical plane. Furthermore, under fastening head 36 a single vertical guide 50 (instead of the two guides 45,46) is provided. The height of force distributor 6 is now statically determined by rods 37 and 47 and guide 50.

In the embodiments of FIGS. 7,8, guides 45,46 and leaf-spring 44 of rod 37, resp. guide 50 and leaf-springs 44 and 49 do not serve for the statical guidance of force distributor 6 with regard to the preloading force in rod 37 and to the measuring force in guide 24, resp. in the rod 47. These elements serve only for the statical guidance of force distributor 6 in the vertical direction.

FIG. 9 shows schematically the disposition of a straight force distributor 6, its guiding components and of the force-transmission elements of the scale. The straight horizontal force distributor 6 is represented by its axis. The pre-loading force is transmitted to force distributor 6 by a first transmission element 51 and the measuring force is transmitted by a second transmission element 52. Both forces are vertical. For the statically determined guidance of force distributor 6 with regard to these forces relative to the not represented frame, four guiding elements are sufficient because the rotation of force distributor 6 around its axis is not considered. Both strings 8 and two guides 53,54 being disposed in planes 55,56 orthogonal to the axis of force distributor 6, serve as guiding elements. Guides 53,54 are disposed horizontally in the same quadrant. String 8 in plane 56 forms a smaller angle with the horizontal plane than the other string 8 in plane 55. The connecting points 57 and 58 of transmission elements 51 and 52 are not symmetrical with regard to strings 8.

The pre-loading force is evenly distributed between strings 8, the measuring force unevenly, e.g. in the proportion 3 : —1. At the same time these two forces acting on force distributor 6 are multiplied when transmitted to strings 8, the measuring force being multiplied to a greater extent than the pre-loading force.

We claim:
1. A mass and force meter comprising
a frame,
a load support,
digital evaluation and display means mounted on said frame,
a force distributor,
first and second strings, each having one end attached to said force distributor at spaced apart locations,
a first transmission element attached to said force distributor, said first transmission element transmitting a pre-tensioning force to said force distributor for pre-tensioning said first and second strings, a second transmission element attached to said force distributor for transmitting a force depending on the load placed on said meter, the longitudinal axes of said first and second strings and said first and second transmission elements not intersecting at a common point thereby distributing the forces exerted thereby over said force distributor, said strings vibrating transversely when electrically excited, means for applying to the evaluation and display means resultant frequency variations caused by the application of said forces to said strings for computation and display of the magnitude of said load, and a guide having one end connected to said frame and its other end connected to said force distributor, said guide and said strings guiding said force distributor in a statically defined way relative to said frame with respect to said pre-tensioning force and said force depending on the load to be measured.

2. A mass and force meter as defined by claim 1 wherein said first transmission element is attached to said force distributor at a location intermediate the points of attachment of said strings.

3. A mass and force meter as defined by claim 1 which further comprises a pre-loading mass for applying a force to said transmission element.

4. A mass and force meter as defined by claim 1 wherein the other ends of said first and second strings are attached to said frame.

5. A mass and force meter as defined by claim 1 wherein the other ends of said first and second strings are attached to said load support.

6. A mass and force meter as defined by claim 1 wherein said first transmission element comprises a lever attached to said load support and to said force distributor, the other ends of said strings being secured to said lever, said force distributor and frame being further provided with opposing knife edges separated by a support element.

7. A meter for measuring the mass of a load comprising a frame, a load support, digital evaluation and display means mounted on said frame, a force distributor, first and second strings, each having one end attached to said frame and the other ends attached to said force distributor at spaced apart locations, a preloading mass, a first transmission element having one end attached to said preloading mass and the other end attached to said force distributor at a location intermediate the points of attachment of said strings, a second transmission element having one end attached to said mass and the other end to said force distributor, the longitudinal axes of said first and second strings and said first and second transmission element not intersecting at a common point thereby distributing the forces exerted thereby over said force distributor, said strings vibrating transversely when electrically excited, means for applying to the evaluation and display means resultant frequency variations caused by the application of said forces to said strings for computation and display of the magnitude of said load, and a guide having one end connected to said frame and its other end connected to said force distributor, said guide and said strings guiding said force distributor in a statically defined way relative to said frame with respect to said pre-tensioning force and said force depending on the load to be measured.

* * * * *